United States Patent [19]
Yajima

[11] Patent Number: 5,646,680
[45] Date of Patent: Jul. 8, 1997

[54] ENDOSCOPE SYSTEM HAVING A SWITCH FORCIBLY SET TO DISPLAY VIDEO SIGNALS NOT PASSED THROUGH OUTER PERIPHERAL APPARATUS

[75] Inventor: Manabu Yajima, Hachioji, Japan

[73] Assignee: Olympus Optical Co., Ltd., Tokyo, Japan

[21] Appl. No.: 527,082

[22] Filed: Sep. 12, 1995

[30] Foreign Application Priority Data

Oct. 20, 1994 [JP] Japan ..................... 6-255770

[51] Int. Cl.$^6$ .............................. A61B 1/04; H04N 7/18
[52] U.S. Cl. .................................. 348/74; 600/109
[58] Field of Search ...................... 348/74, 45, 65, 348/75; 600/109; H04N 7/18

[56] References Cited

U.S. PATENT DOCUMENTS

| | | | |
|---|---|---|---|
| 5,029,016 | 7/1991 | Hiyama et al. | 348/74 |
| 5,412,478 | 5/1995 | Ishihara et al. | 348/74 |
| 5,543,831 | 8/1996 | Tsuji et al. | 348/75 |

FOREIGN PATENT DOCUMENTS

| | | |
|---|---|---|
| 1-214333 | 8/1989 | Japan. |
| 6-142036 | 5/1994 | Japan. |

*Primary Examiner*—Howard W. Britton
*Attorney, Agent, or Firm*—Armstrong, Westerman, Hattori, McLeland & Naughton

[57] ABSTRACT

A first video signal is produced in a video signal processing circuit within a video processor by an imaging device provided in an endoscope, is put into a switching circuit, has the tone and the like corrected by a picture image correcting circuit within an outer peripheral apparatus provided outside the video processor and is converted to a second video signal electrically different from the first video signal. The second video signal is recorded and is displayed in a color monitor through a switching circuit. In case the outer peripheral apparatus is abnormal and a normal picture image is not displayed in the color monitor, by the operation of a forcibly set switch, the first video signal produced in the video signal processing circuit within the video processor will be quickly displayed in the color monitor without being passed through the outer peripheral apparatus.

26 Claims, 9 Drawing Sheets

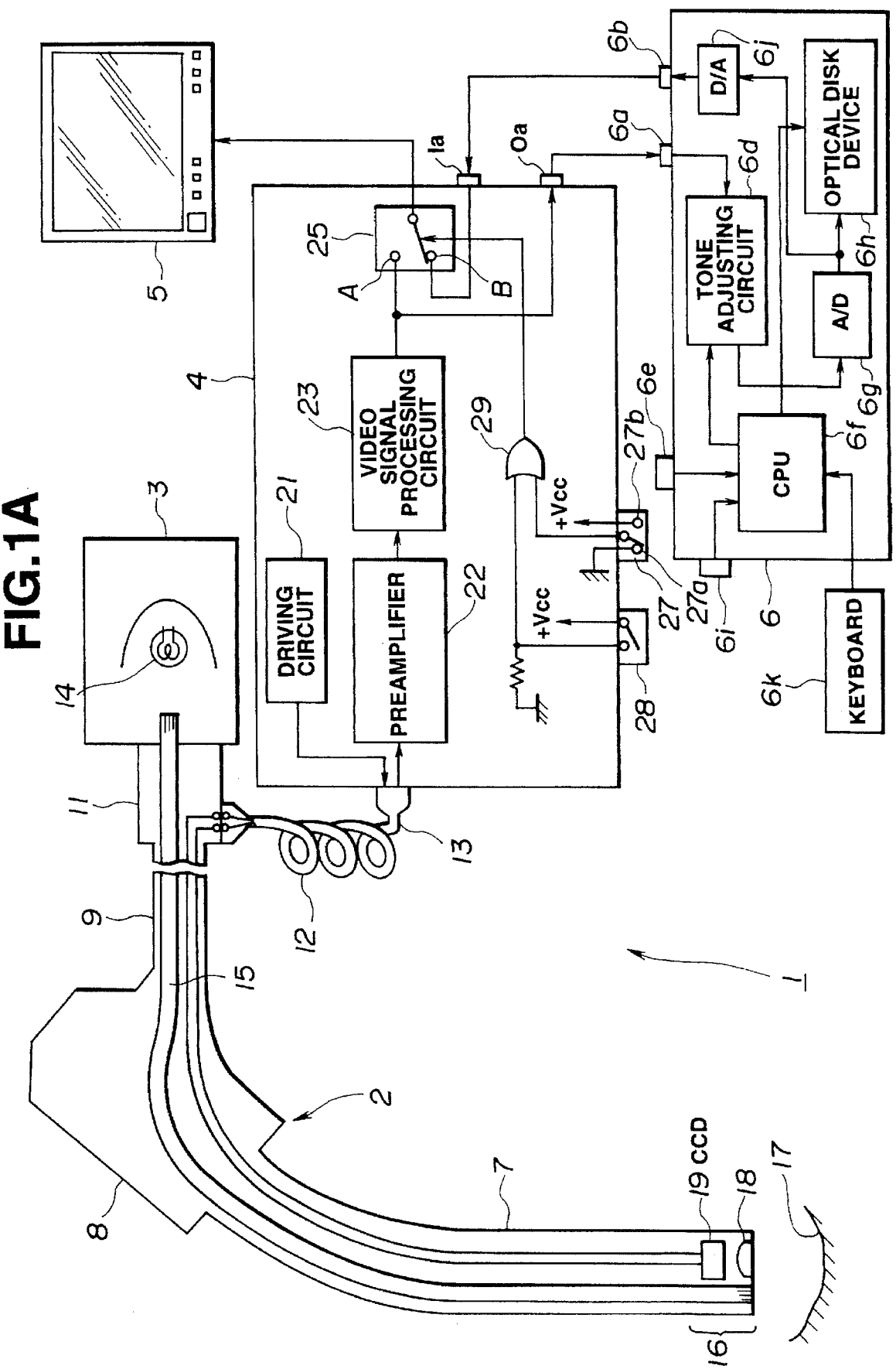

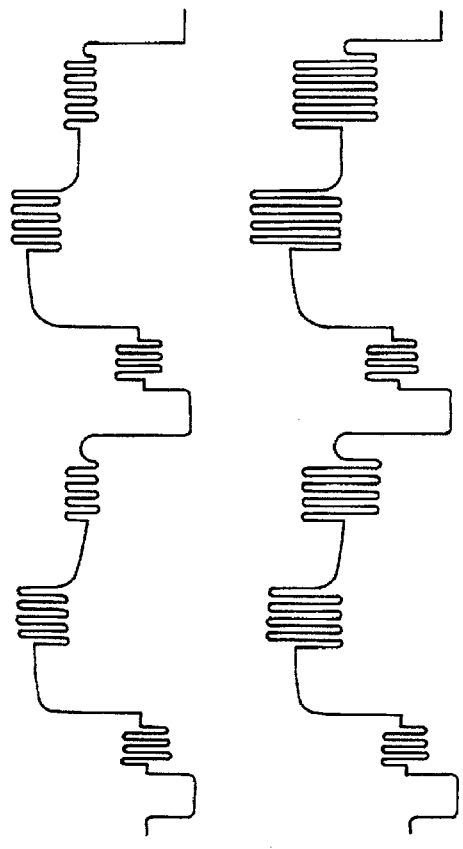
FIG.1B
FIG.1C
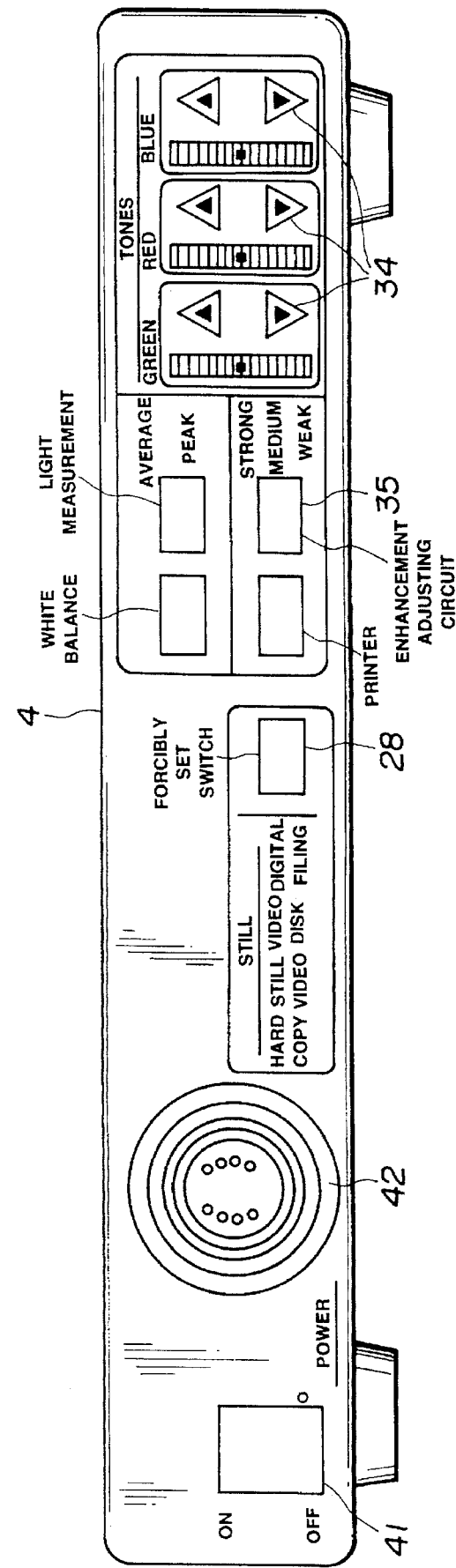
FIG.2

ENDOSCOPE SYSTEM HAVING A SWITCH FORCIBLY SET TO DISPLAY VIDEO SIGNALS NOT PASSED THROUGH OUTER PERIPHERAL APPARATUS

BACKGROUND OF THE INVENTION

Field of the Invention and Description of Related Arts

This invention relates to an endoscope system having a switch forcibly set to display such video signals not passed through outer peripheral apparatus as record endoscope picture images.

Recently, endoscopes have come to be extensively used in the medical and industrial fields. Other electronic endoscopes having imaging means built-in than the conventional optical endoscopes have also come to be extensively used.

In the case of the electronic endoscope, an endoscope system using a signal processing apparatus processing signals for an imaging means other than the light source device used in the case of the optical endoscope and producing video signals and a displaying means displaying video signals produced by this signal processing apparatus is used for an endoscopic examination or diagnosis.

This endoscope system or endoscope apparatus is connected with such outer peripheral apparatus or outer apparatus as a recording and reproducing apparatus recording and reproducing video signals corresponding to the endoscope picture images and is utilized to record picture images or reproduce recorded video signals or is connected with a filing apparatus, is made a data base and is made an apparatus formation or system formation so as to be able to be more effectively utilized for the diagnosis and therapy in some case.

For example, in the first prior reference disclosed in the publication of Japanese patent application laid open No. 214333/1989, in an apparatus wherein an analogue output obtained from a solid state imaging device is A/D converted, is variously digital-processed, is then D/A converted and is displayed in a monitor, in case said digital processing part is abnormal, said digital processing part will be bypassed and said analogue output will be displayed in a monitor.

In the second prior reference disclosed in the publication of Japanese patent application laid open No. 142036/1994, in an endoscope concentrating system wherein such devices as a video processor, scope, light source device, high frequency knife and hemostatic device are controlled by one host controller through respective interfaces (I/F), in case said host controller runs abruptly, an abruptly running sensing circuit will sense said abrupt running and a message urging the user to push a resetting switch resetting the operation of said host controller will be displayed on an observing monitor which the user will be seeing.

When said resetting switch is pushed, until said host controller returns to be normal, said respective connected devices will not be able to be controlled but said endoscope observed picture images will be secured.

For example, in case a filing apparatus as an outer peripheral apparatus is connected with the signal processing device and a video signal processed such as adjusted in the picture quality is output in a displaying means through this filing apparatus, when this filing apparatus is somewhat abnormal such as the computer forming the filing apparatus runs abruptly, in order to return the filing apparatus to be normal, there will be problems that the outer filing apparatus itself will have to be reset, the resetting will have to be remade and not a little time will be taken until the apparatus is returned.

When an endoscope picture image is observed, that is, at the time of a clinical operation, it will be desirable to return the endoscope picture image to be normal as quickly as possible so as to be observable. Often, when the scope is inserted, the patient will feel unpleasant and painful not a little. Therefore, anyhow, it is not desirable that the endoscope observation is interrupted even for a little time.

In such system formation as in the second prior reference, a video signal having been passed through a filing apparatus for processing signals is not displayed for the output signal of the video processor as a signal processing apparatus and therefore said problems will not be solved.

Even in case said host controller is assumed to form a filing apparatus, as the video processor is connected with the host controller through an I/F and a picture quality adjustment or the like is set, when the host controller becomes abnormal, the set values of said respective picture quality adjustments will be also likely to be abnormally set. In case thus the set values are abnormally set, even if the video signal of the video processor is displayed, the picture image will be difficult to distinguish in some case. Unless the video signal put out of the signal processing apparatus independently of the filing apparatus or host controller in an abnormal state can be displayed by a displaying means, said problems will not be able to be solved.

In another background, according to a hospital, one video processor is used by many doctors in some case.

In such case, some doctor will be likely to set for himself said respective picture quality adjustments. In case another doctor is to begin the observation in this state as it is, what setting should be made will be likely to be unknown. It is desirable to be able to cope with this problem. That is to say, in such case, too, an endoscope system will be desired to be able to quickly display in a set state a reference picture quality or the like.

In the first prior reference, the abnormality (of the digital part) within the body apparatus is detected and the process of the digital part is only bypassed and the relation with the outer connected apparatus or outer device is not reset at all. Therefore, said trouble can not be solved.

OBJECTS AND SUMMARY OF THE INVENTION

An object of the present invention is to provide an endoscope system wherein, in case an outer peripheral apparatus becomes abnormal, the endoscope picture image will be able to be quickly set to be observable.

Another object of the present invention is to provide an endoscope system adapted to an endoscopic examination.

An endoscope system comprises:

an endoscope comprising an elongate insertable section, an illuminating light projecting means projecting an illuminating light out of the distal end of said insertable section, an objective optical system formed at the distal end of said insertable section to observe an object illuminated by said illuminating light and an imaging means photoelectrically converting an image based on said objective optical system;

a signal processing means processing signals for said imaging means and producing a first video signal;

an outer peripheral means provided outside said signal processing means and processing/controlling a second video signal electrically different from said first video signal;

a selecting means selecting either of said first video signal and said second video signal;

a displaying means displaying either of said first and second video signals selected by said selecting means; and a regulating means regulating the selection of said selecting means to forcibly output said first video signal to said displaying means;

so that, in case the outer peripheral apparatus outputs a video signal which is not normal, the first video signal may be set to be output to the displaying means by the regulating means and the endoscope picture image by the normal first video signal will be displayed by this setting. Therefore, even if the outer peripheral apparatus becomes abnormal during the endoscopic examination, the endoscope picture image will be able to be quickly set to be observable.

BRIEF DESCRIPTION OF THE DRAWINGS

FIGS. 1A to 1C relate to the first embodiment of the present invention. FIG. 1A is a block diagram showing the formation of an endoscope system of the first embodiment.

FIG. 1B is a waveform diagram showing the waveform of a video signal put into the filing apparatus.

FIG. 1C is a waveform diagram showing the waveform of a video signal put out of the filing apparatus.

FIG. 2 is an elevation of a video processor in the second embodiment of the present invention.

DETAILED DESCRIPTION OF THE PREFERRED EMBODIMENTS

Figure 3:
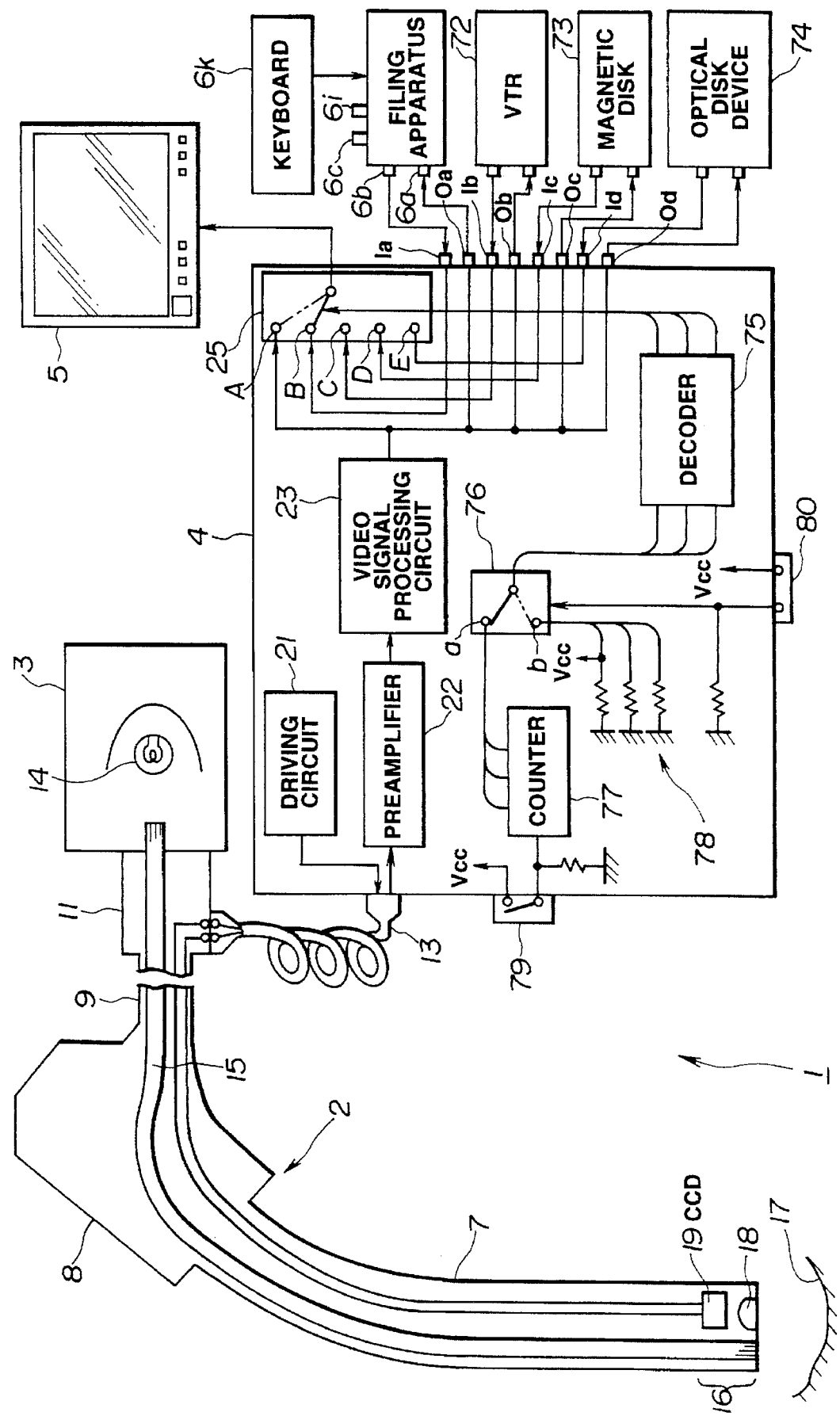
FIG. 3 is a block diagram showing the formation of an endoscope system of a modification of the second embodiment.

The embodiments of the present invention shall be concretely explained in the following with reference to the drawings.

As shown in FIG. 1A, the endoscope system 1 of the first embodiment of the present invention comprises an electronic endoscope (which shall be also mentioned merely as a scope hereinafter) 2 having an imaging means built-in, a light source device 3 as an illuminating light feeding means feeding an illuminating light to this scope 2, a video processor 4 as a signal processing device processing signals for a solid state imaging device of this scope 2, a color monitor 5 as a displaying means displaying video signals output through this video processor 4 and a filing apparatus 6 as an outer apparatus or outer peripheral apparatus connected with the video processor 4 and having an endoscope picture image filing function.

Said scope 2 has an elongate insertable section 7 having a flexibility, a wide operating section 8 formed at the rear end of this insertable section 7 and a universal cord 9 extended out of this operating section 8 so that a light guide connector 11 provided at the distal end of this universal cord 9 can be removably connected to the light source device 3.

A signal cable 12 is extended out of the side of this light guide connector 11 so that a signal connector 13 provided at the distal end of this signal cable 12 can be removably connected to the video processor 4.

A white light generated in a lamp 14 contained within the light source device 3 is radiated and fed to the incident side end surface of a light guide 15 of the light guide connector 11, is transmitted by this light guide 15 inserted through the interior of the universal cord 9 and is projected to the side of such object to be illuminated as an affected part within a body cavity in front of the projecting side end surface fitted to an illuminating window of the tip part (distal end part) 16 of the insertable section 7.

The object 17 illuminated by the illuminating light projected from the illuminating light projecting means on the distal end side of the insertable section 7 has an image formed in its focal plane by an objective lens 18 fitted to an observing window formed adjacently to the illuminating window. For example, a CCD (charge coupled device) 19 is arranged as a solid state imaging device in this focal plane to photoelectrically convert the formed optical image.

When the signal connector 13 connects to the video processor 4, the CCD 19 will be connected with the driving circuit 21 and preamplifier 22 within the video processor 4 through the signal lines inserted through the insertable section 7. When the driving signal from the driving circuit 21 is impressed on the CCD 19, a photoelectrically converted signal will be output as a CCD output signal from the CCD 19 and will be amplified by the preamplifier 22.

The signal amplified by the preamplifier 22 is put into a video signal processing circuit 23 to produce a video signal. This video signal is put into the inputting end 6a of the filing apparatus 6 as an outer apparatus through a signal line connected to a video signal outputting end Oa for the outer apparatus (or outer peripheral apparatus).

The video signal input from this inputting end 6a is passed through a tone adjusting circuit 6d within this filing apparatus 6 and, for example, the tone adjusting resistance value of the tone adjusting circuit 6b can be varied and set through a CPU 6f by the operation of an adjusting switch 6e. The video signal processed to adjust the tone and picture quality through this tone adjusting circuit 6d is converted to a digital signal by an A/D converter 6g and is then put into an optical disk device 6h which is to be a picture image recording means and the picture image can be recorded through the CPU 6f by the operation of a releasing switch 6i.

The signal put into this optical disk device 6h is converted to an analogue video signal by a D/A converter 6j and is put out of the outputting end 6b of the filing apparatus 6. Also, in case the picture image recorded in the optical disk device 6h is reproduced, the picture image will be converted to an analogue video signal by the D/A converter 6j and the analogue video signal will be put out of the outputting end 6b of the filing apparatus 6. Therefore, the video signal input from the inputting end 6a and the video signal output from the outputting end 6b are electrically different from each other in the waveform or level. For example, when the waveform of the video signal of the NTSC system at the inputting end 6a is as in FIG. 1B, the waveform of the video signal at the outputting end 6b will be a waveform stressed in the tone (chroma saturation) as in FIG. 1C by the tone adjusting circuit 6d within the filing apparatus 6.

In this filing apparatus 6, the filing function is also controlled by the CPU 6 within it. The picture image can be also searched by a command from the keyboard 6k or an input of data.

The video signal put out of the video signal processing circuit 23 is impressed on one contact (or terminal) of the switching circuit 25 as a selecting means and the video signal put of the outputting end 6b of this filing apparatus 6 is impressed on the other contact (or terminal) of the switching circuit 25 through the video signal inputting end Ia for the outer apparatus.

The video signal selected by this switching circuit 25 is output to a color monitor 6 connected to its common contact and an endoscope picture image corresponding to the displaying surface of the color monitor 6 is displayed.

Said switching circuit 25 can be selected so that the contact A or B may be selected through an Or circuit 29 by a selecting switch 27 provided on the front panel or the like of the video processor 4. Also, the other inputting end of the Or circuit 29 is connected to the GND through a pull-down resistance and is connected to a power source end +Vcc through a forcibly set switch 28 instructing operating to regulate the selection of the switching circuit 25 to one.

Therefore, when, as shown in FIG. 1A, the forcibly set switch 28 is not operated, if the contact 27a is set to be ON with the GND by the selecting switch 27, the contact B of the switching circuit 25 will be switched ON and, if the contact 27b is set to be ON with the power source end +Vcc by the selecting switch 27, the contact A of the switching circuit 25 will be switched ON.

In case the filing apparatus 6 is connected to the video processor 4, usually the selecting switch 27 will be operated to switch ON the contact B of the switching circuit 25 and then the video signal produced within the video processor 4 will be further put into the filing apparatus 6 from the video signal outputting end Oa, will have the tone adjusted and then will be output to the color monitor 5 through the switching circuit 25.

It is a feature that, whichever state the selecting switch 27 may be in, when the forcibly set switch 28 is switched ON, the output of the Or circuit 29 will be set on the "H" level and the contact A of the switching circuit 25 will be forcibly set or switched to be ON.

The operation of the thus formed first embodiment shall be explained in the following. When the devices forming the endoscope system 1 are respectively connected as shown in FIG. 1A, an endoscopic examination will be ready to be made. When the power source not illustrated is switched on and the scope 2 is inserted into the body cavity of the patient, the image of such object 17 as an affected part within the body cavity will be taken by the imaging means using the CCD 19.

In case the filing apparatus 6 is connected to the video processor 4, the selecting switch 27 will be operated so that the picture image may be recorded and the contact B of the switching circuit 25 will be set to be switched ON.

In this state, the imaged signal is processed to be converted to a video signal (first video signal) by the video signal processing circuit 23 of the video processor 4, is then put into the filing apparatus 6, becomes a video signal (second video signal) in which the picture quality is adjusted by the tone adjusting circuit 6d, is put into the optical disk device 6h as a recording device within the filing apparatus 6, can be recorded by the instruction of release, is output to the color monitor 5 through the contact B of the switching circuit 25 again from the outputting end 6b and can display the endoscope picture image on the color monitor displaying surface.

In case the temperature adjusting function by the temperature adjusting apparatus, for example, in the operating room becomes abnormal during the endoscopic examination, therefore the CPU 6f of the filing apparatus 6 becomes higher than, for example, the allowable temperature and the operation runs abruptly and becomes abnormal, the control of the tone adjusting circuit 6d through the CPU 6f by the adjusting switch 6e will be likely to be also of an abnormal set value.

Therefore, in the case of abnormal states that the endoscope picture image displayed in the color monitor 5 by the video signal put out of the filing apparatus 6 is displayed in an abnormal tone and that the frozen picture or the like recorded in the filing apparatus 6 continues to be put out and a real time moving picture (endoscope picture image) is not displayed, the operator may switch ON the forcibly set switch 28 provided on the front panel of the video processor 4.

When this forcibly set switch 28 is switched ON, the switching circuit 25 will be switched ON the contact A from the contact B and, in this state, the video signal processed by the signal processing circuit 23 will be put directly into the color monitor 5 without being processed in the filing apparatus 6 (or independently of the filing apparatus 6) and the endoscope picture image corresponding to this video signal will be displayed.

That is to say, when the forcibly set switch 28 is operated, in a moment, the real time endoscope picture image corresponding to the video signal by the signal processing system of the video processor 4 will be able to be displayed.

According to the thus operating first embodiment, in the case of an abnormal state in which the video signal output to the color monitor 5 is not normal, if the user merely operates the forcibly set switch 28, the video signal by only the video processor 4 and not influenced by the filing apparatus 6 will be output to the color monitor 5 and the corresponding endoscope picture image will be able to be displayed.

Therefore, according to this first embodiment, even if such abnormal state as is mentioned above occurs during the endoscopic examination, the endoscope picture image taken by the imaging means will be able to be quickly set to be able to be observed by a simple operation.

This first embodiment is different from the above described second prior reference as follows. In the second prior reference, as a component requirement, when the outer host controller becomes abnormal (such as the abnormal display of the picture image), the operation of this host controller will be reset. However, the first embodiment is different in respect that the endoscope picture image by the video processor 4 is switched to be displayed and the normal endoscope picture image is secured to be displayed.

In the second prior reference, the abnormal host controller itself is reset, the forcibly set operation is transmitted to the I/F circuit through this host controller and the abnormal device is reset as a prerequisite of securing the required minimum transmitting route though not perfectly normal.

On the other hand, in the first embodiment, the abnormal device is abnormal after all and only a part is trusted not to be broken and is used. From the special using state of the endoscope (that is, the safety priority after all and the returning time priority to the normal return), the second prior reference is considered to have points to be improved.

Further, the abnormality is difficult to specify how far the abnormality is and how far the normality is. It is desirable to cope with the assumed worst case.

Also, the second prior reference has no respective inputting and outputting ends through which the video processor exchanges picture image information and therefore can not dissolve such problems as are described in the paragraph of the related arts.

FIG. 2 shows an elevation of the video processor 4 in the second embodiment of the present invention. As shown in this FIG. 2, a power source switch 41, signal connector receiver 42, forcibly set switch 28, enhancement adjusting switch 35 and tone adjusting switch 34 are provided on the front panel of the video processor 4.

Further, a white balance setting switch and others are provided. Also, a printer, still video device and video disk device can be connected. By operating a switch for printing or recording still pictures, hard copies are made or recorded in the corresponding apparatus.

According to this second embodiment, the same as in the first embodiment, in case the filing apparatus 6 outputs an abnormal video signal, by operating the forcibly set switch 28 to be ON, a video signal will be able to be set by the signal processing system (that is, the preamplifier 22 and video signal processing circuit 23) of the video processor 4 electrically cut off the filing apparatus 6 and will be able to be output to the color monitor 5 through the contact A of the switching circuit 25.

FIG. 3 shows an endoscope system 1 of a modification of the second embodiment of the present invention. This endoscope system 1 can correspond to a plurality of peripheral apparatus in the endoscope system 1 of the first embodiment.

Therefor, the switching circuit 25' within the video processor 4 has plural contacts A, B, C, D and E, the output signal of the video signal processing circuit 23 is impressed on the contact A and the output signals respectively of the filing apparatus 6, VTR 72, magnetic disk device 73 and optical disk device 74 are impressed respectively on the contacts B, C, D and E respectively through the video signal inputting ends Ia, Ib, Ic and Id.

Also, the output signal of the video signal processing circuit 23 is impressed on the respective video signal inputting ends of the filing apparatus 6, VTR 72, magnetic disk device 73 and optical disk device 74 through the video signal outputting ends Oa, Ob, Oc and Od, respectively.

The switching circuit 25' is formed of a multiplexer or analogue switch. At the switching controlling end is selected one contact in response to the value of the selected signal, for example, of three bits impressed through a decoder 75. A video signal through the selected contact is put out of the color monitor 5.

This decoder 75 is connected to a counter 77 through a contact a of a switch 76 formed of an analogue switch and is connected to a presetting resistance 78 through a contact b. In this state, as shown in FIG. 2, the contact a is selected and the output of the counter 77 is selected. The inputting end of this counter 77 is connected to the earth through a pull-down resistance and is connected to a selecting switch 79. When this selecting switch 79 is operated once, the inputting end of the counter 77 will vary from "L" to "H" and, by its rise, one output of the counter 77 will vary, the selecting signal through the decoder 75 will vary by one bit and the contacts A to E will be able to be cyclically selected.

For example, if the contact A is selected before the selecting switch 79 is pushed, when the selecting switch 79 is pushed once, the contact B will be selected. Also, if the contact E is selected before the selecting switch 79, when the selecting switch 79 is pushed once, the contact A will be selected.

On the other hand, when the forcibly set switch 80 connected to the switching controlling end of the switch 76 is operated to be ON from OFF, the switching controlling end of the switch 76 will vary from "L" to "H" and, as shown by the two-point chain line, the contact b will be selected. When the contact b is selected, the digital data set by a presetting resistance 78 will be impressed at the switching controlling end of the switching circuit 25' through the decoder 75 and, as shown by the two-point chain line, the contact A will be forcibly selected to be ON.

The video signal put through the inputting ends into the VTR 72, magnetic switch 73 and optical disk device 74 can have the tone and the like variably set by the control of the CPU's not illustrated within the respective apparatus the same as in the case of the filing apparatus 6, the video signal of the set tone can be recorded by a video recording means within, is impressed on the contacts B to E of the switching circuit 25' within the video processor 4 and is output to the monitor 5 through the selected contact.

The other formations are the same as in the first embodiment. According to this second embodiment, by the operation of the selecting switch 79, any contact is selected from the contacts A to E of the switching circuit 25' through the counter 77 and a video signal can be output to the color monitor 5 through the selected contact. For example, when the contact A is ON, a video signal will be set so as to be able to be recorded in the VTR. In case it is desired to display (or monitor) in the color monitor 5 the video signal passed through the VTR 72, when the selecting switch 79 is operated twice, the contact C will be able to be set to be ON and the video signal passed through the VTR 72 will be able to be displayed in the color monitor 5.

In case the CPU within the VTR 72 thermally runs abruptly and its controlling function becomes abnormal, the tone of the video signal having has the tone adjusted through the VTR 72 will be likely to vary and the variation of the tone will be known from the display in the color monitor 5. In such case, if the forcibly set switch 80 is operated, the contact b of the switching switch 76 will be able to be switched to be ON. By this switching, the preset data by the resistance 78 will be impressed at the switching controlling end of the switching circuit 25' through the decoder 75, the contact A will be quickly switched ON and the video signal in the video signal processing circuit 23 within the video processor 4 will be put out of the color monitor 5 without being passed through the outer peripheral apparatus (the VTR 72 in this case).

In case the forcibly set switch 80 is absent, unless the selecting switch 79 is pushed three times continuously, the contact A will not be able to be set ON. When the filing apparatus 6 is selected, in case the filing apparatus 6 does not operate normally, the selecting switch will have to be operated four times. When the number of pushing times is mistaken, the switch will have to be operated in excess until the contact A is again ON.

On the other hand, in this embodiment, as the forcibly setting switch 80 is provided, when the switch is operated only once, the endoscope picture image will be able to be quickly set to be displayed in an ordinary tone.

Figure 4:
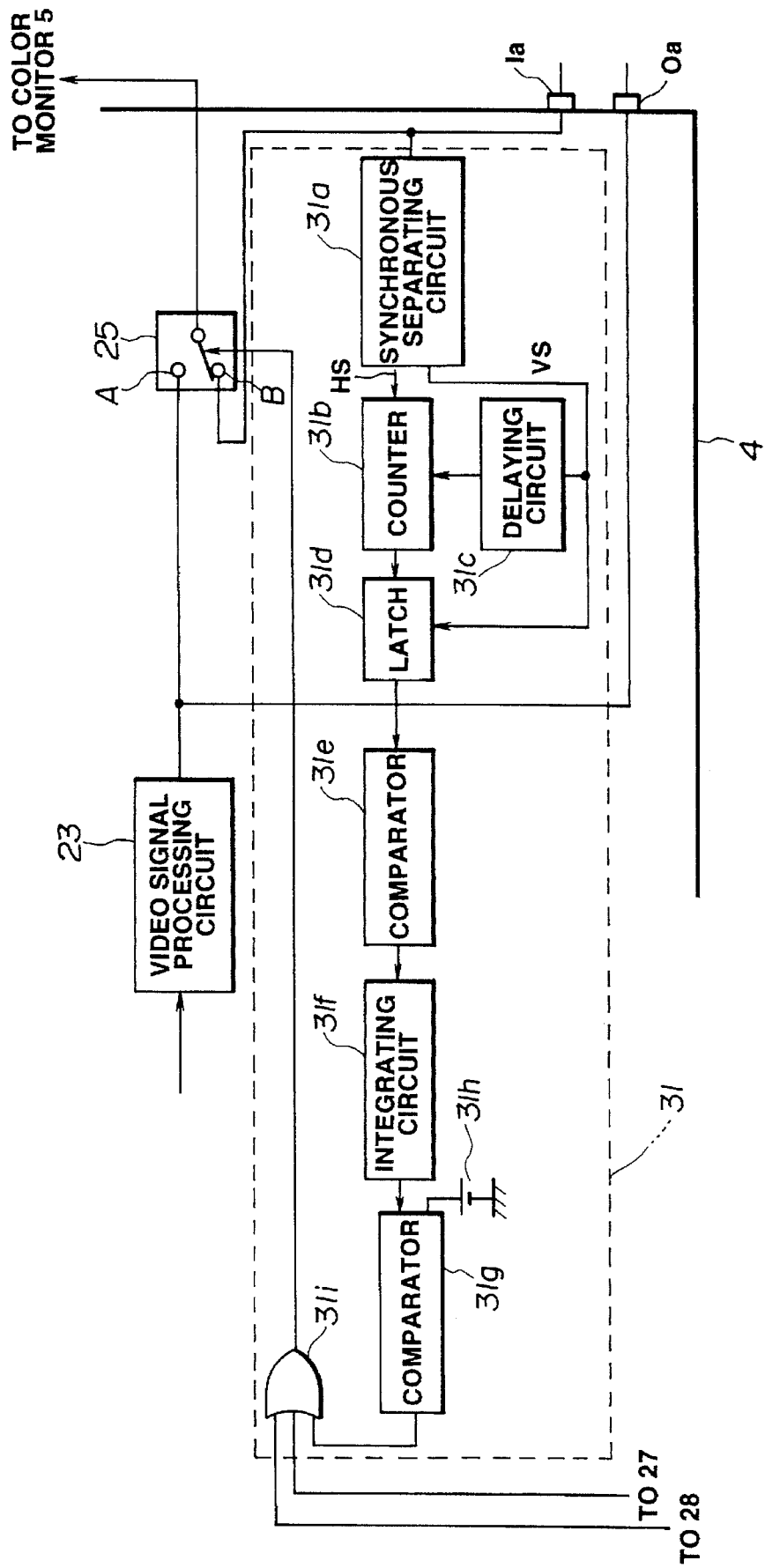
FIG. 4 is a block diagram showing the formation of a main part in the third embodiment of the present invention.

FIG. 4 shows the formation of a part of the video processor 4 in the third embodiment of the present invention.

This third embodiment has not only the function of the first embodiment but also a function of detecting the abnormality of a synchronous signal component of the video signal input from the filing apparatus 6 so that, in case the abnormality of the synchronous signal component is detected, the switching switch 25 will be automatically switched.

That is to say, in the video processor 4 of this third embodiment, in FIG. 1A, the video signal put into the video processor 4 from the video signal inputting end Ia for the outer device is impressed on the contact B of the switching circuit 25 and is put into a synchronous abnormality detecting circuit 31 detecting the abnormality of the video signal by the abnormality of the synchronous signal component.

In this synchronous abnormality detecting circuit 31, the horizontal and vertical synchronous signals are separated or extracted from the video signal input by a synchronous separating circuit 31a, the separated horizontal synchronous signal HS is impressed at the clock inputting end of a counter 31b, the vertical synchronous signal VS is impressed at the resetting terminal of the counter 31b through a delaying circuit 31c and the horizontal synchronous signals are counted by the time between the adjacent vertical synchronous signals VS and are latched by a latching circuit 31d just before the counter 31b is reset.

This latched counted value is compared with a reference value by a digital comparator 31e. In case the latched counted value does not coincide with the reference value, the output value, for example, of "H" is integrated in an integrating circuit 31f, this integrated value is compared with a threshold value 31h by an analogue comparator 31g and, in case the threshold value 31h is exceeded, the switching circuit 25 will be switched through a 3-input Or circuit 31i and the contact A will be selected. A selecting switch 27 and forcibly set switch 28 are connected to the two inputting ends of this Or circuit 31i.

The other formations are the same as in the first embodiment and shall not be explained here.

In this third embodiment, in case the video signal is displayed in the color monitor through the outer apparatus, when the video signal is not normal, the synchronous signal will be likely to be also abnormal.

When the display of the video signal is normal, the period of the horizontal synchronous signal and vertical synchronous signal will not fluctuate. In such case, when the number of pulses of the horizontal synchronous signal is counted within the period in which the next vertical synchronous signal is input, the number will be of a predetermined value. In this state, the output of the comparator 31e will remain "L" as it is and the output of the integrating circuit 31f will be also 0. Therefore, the output of the comparator 31g will also remain "L" as it is.

On the other hand, when the display of the video signal is not normal, the period of either of the horizontal synchronous signal and vertical synchronous signal of the synchronous signal will be anticipated to fluctuate. In such case, the counted value counted by the counter 31b will deviate from the predetermined value and the output of the comparator 31e will be "H". Further, when the output of the comparator 31e thus continues to be "H", the output of the integrating circuit 31f will become large. When the value of the output of the integrating circuit 31f exceeds the threshold value 31h, the output of the second comparator 31g will become "H". Then, the switching circuit 25 will be automatically switched by the Or circuit 31i so that the contact A may be ON and the output signal of the video signal processing circuit 23 will be output directly to the color monitor 5.

According to this embodiment, in case the outer apparatus becomes abnormal and the video signal through the outer apparatus is not displayed, the synchronous signal will be anticipated to also become abnormal and, in such case, the contact B of the switching circuit 25 will be switched to the contact A to be ON and the video processor 4 side video signal will be able to be automatically displayed in the color monitor 5.

By the way, in FIG. 4, the case that the outer apparatus is one is explained. In case the outer apparatus are plural, if a plurality of synchronous abnormality detecting circuits 31 are provided, the case of a plurality of outer apparatus will be able to be also coped with the same.

Figure 5:
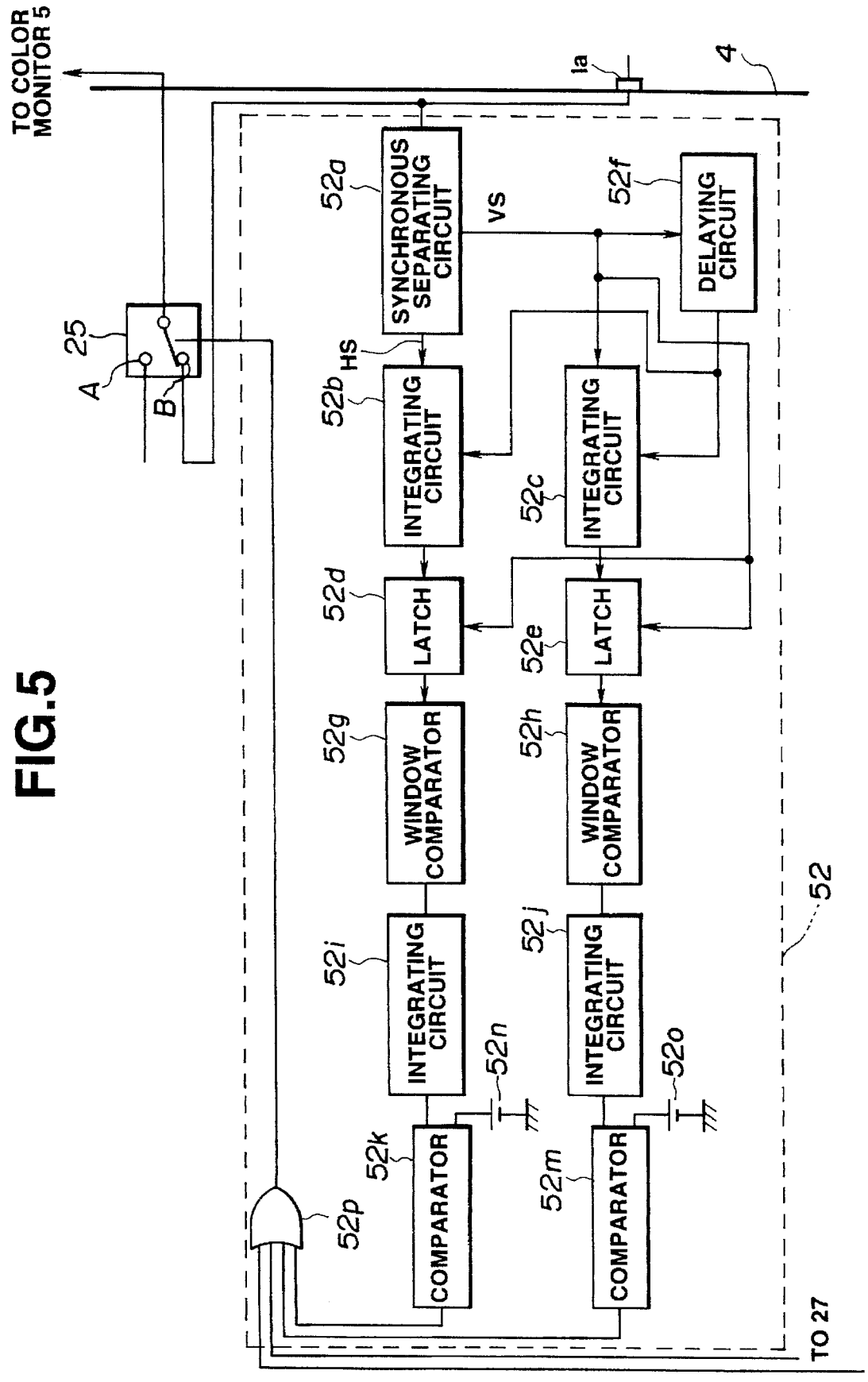
FIG. 5 is a block diagram showing the formation of a main part in a modification of the third embodiment.

FIG. 5 shows the formation of a part of the video processor 4 in a modification of the third embodiment. This modification is provided with the same function as of the third embodiment.

That is to say, in the video processor 4 of this modification, in FIG. 1A, the video signal put into the video processor 4 from the video signal inputting end Ia for the outer device is impressed on the contact B of the switching circuit 25 and is put into a synchronous level abnormality detecting circuit 52 detecting the abnormality of the video signal by the abnormality of the level of the synchronous signal.

In this synchronous level abnormality detecting circuit 52, horizontal and vertical synchronous signals are separated or extracted from the input video signal by a synchronous separating circuit 52a and the separated horizontal synchronous signal HS and vertical synchronous signal VS are put respectively into integrating circuits 52b and 52c and their integrated values are calculated.

The respective integrated values by the integrating circuits 52b and 52c are latched respectively in latching circuits 52d and 52e at the edge of the vertical synchronous signal and are reset by the vertical synchronous signal slightly delayed by a delaying circuit 52f just after being latched. The respective latched integrated values are put into window comparators 52g and 52h and are compared with a reference value. In case the integrated values deviate from the reference value, the window comparators 52g and 52h will output the values of "H".

The respective outputs of the window comparators 52g and 52h are integrated by the integrating circuits 52i and 52j. These integrated values are put into comparators 52k and 52m, are compared respectively with threshold values 52n and 52o. In case the threshold values 52n and 52o are exceeded, the switching circuit 25 will be switched through the 4-input Or circuit 52 and the contact A will be selected. The outputs of the selecting switch 27 and the forcibly setting switch 28 are put into the 4-input Or circuit 52.

The other formations are the same as of the first embodiment and shall not be explained here. The operation of this modification shall be explained in the following:

When the video signal of the outer apparatus is normally displayed, the horizontal synchronous signal and vertical synchronous signal will be output in a predetermined period. Therefore, when the horizontal synchronous signal is integrated in the period of adjacent vertical synchronous signals, a predetermined value will be obtained and the integrated value of the synchronous signal will be also a predetermined value.

On the other hand, when the video signal of the outer apparatus is not normally displayed, the level of the horizontal synchronous signal for the period of the adjacent vertical synchronous signals will lack and will be anticipated to be not normal. In such case, the integrated level of the integrating circuit 52b will fluctuate from the normal value and therefore will be detected by the window comparator 52g.

Also, in case the horizontal synchronous signal is normal, the vertical synchronous signal lacks and the level is not normal, the integrated level of the integrating circuit 52b and the integrated level of the integrating circuit 52c will fluctuate from the normal value. When such fluctuation continues and the threshold value 52n or 52o is exceeded, the output of the comparator 52k or 52m will become "H" and the contact B of the switching circuit 25 will be automatically switched to the contact A.

This modification has been explained in the case of one outer apparatus. However, as explained on the third embodiment, this modification can be applied also to the case of a plurality of outer apparatus.

This modification has been explained on the formation of detecting the abnormality of the level of the synchronous signal. However, in FIG. 5, in case the signal to be integrated by the integrating circuit 52b is a luminance signal instead of the horizontal synchronous signal, the abnormality will be able to be detected from the luminance level of the video signal. That is to say, in the endoscope apparatus, an illuminating light amount control (or iris control) or AGC so that a video of a brightness adapted to the diagnosis may be obtained is adopted. Therefore, in the ordinary observation, the average luminance of the video is substantially constant.

On the other hand, when the video signal is abnormal, the luminance level will be anticipated to be abnormal. When the abnormality of the luminance level is detected as mentioned above, the abnormality of the video signal will be able to be often detected.

Figure 6:
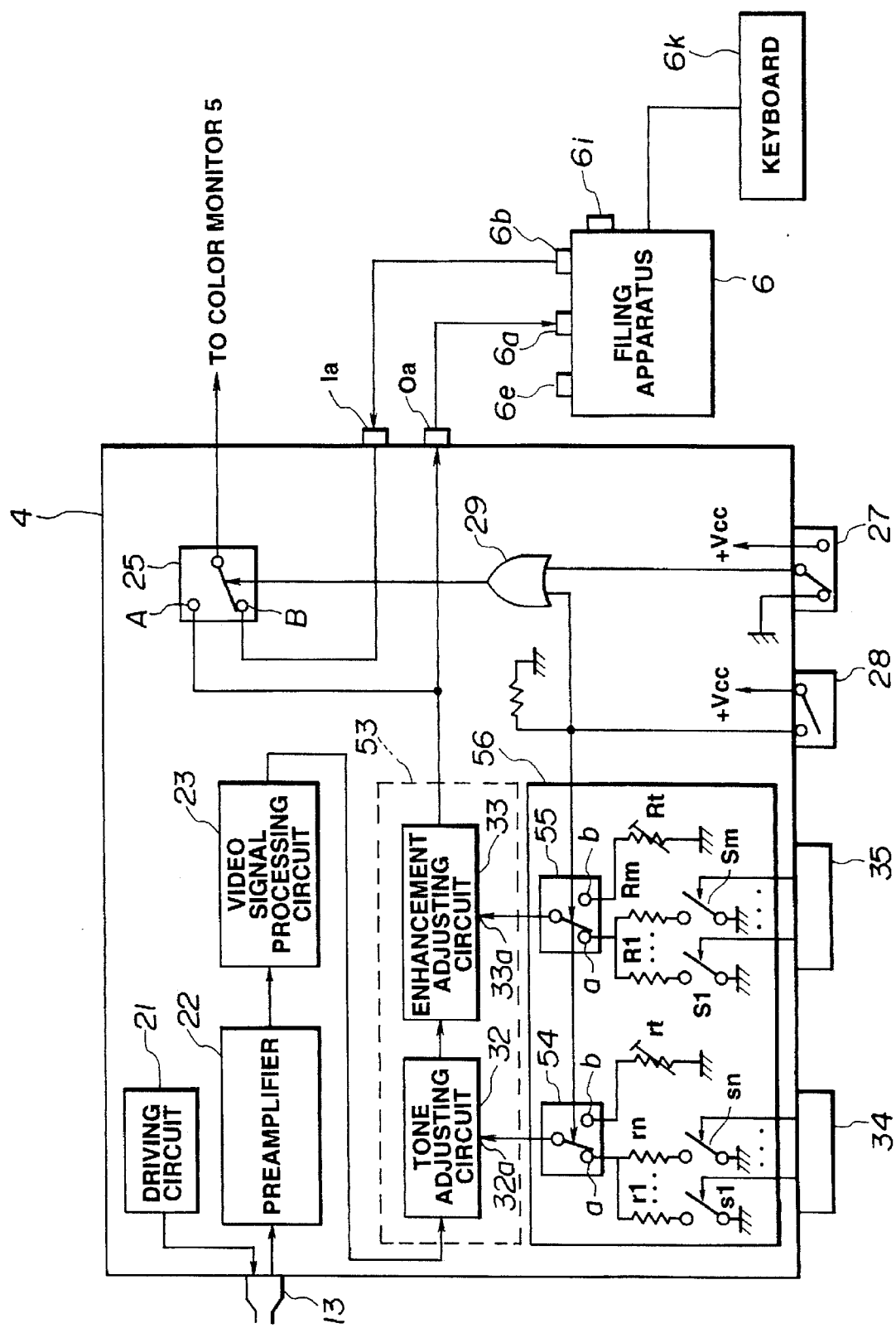
FIG. 6 is a block diagram showing the formation of a video processor in the fourth embodiment of the present invention.

FIG. 6 shows the formation of the video processor 4 of the fourth embodiment of the present invention. In this fourth embodiment, in order that the endoscope observed picture image may be returned fastest without waiting for the normal return of the filing apparatus 6, the output picture image to the color monitor 5 is immediately switched to an endoscope picture image made by the video processor 4 itself from the picture image processed by the filing apparatus 6 and at the same time the video processor 4 is immediately made to be in the initial state (or reference set state) so as to be able to be immediately set in the reference set state in case it is to be used by plural doctors.

In this video processor 4, a picture quality correcting circuit (picture quality setting circuit) 53 is interposed between the video signal processing circuit 23 and switching circuit 25 in the video processor 4 (See FIG. 1A) in the first embodiment. This picture quality correcting circuit 53 is formed of a tone adjusting circuit 32 adjusting the tone and an outline adjusting circuit (also called an enhancement adjusting circuit) 33 adjusting the stressing amount of the outline.

That is to say, the video signal put out of the video signal processing circuit 23 has the tone and enhanced amount (outline stressed amount) adjusted through the tone adjusting circuit 32 and enhancement adjusting circuit 33 forming the picture quality setting means setting (determining) the picture quality, is then impressed on one contact A of the switching circuit 25 and is put into the filing apparatus 6 through a signal line connected to the video signal outputting end Oa for the outer apparatus. Also, the same as in the first embodiment, the video signal put out of the filing apparatus 6 is impressed on the other contact B of this switching circuit 25 through the video signal inputting end Ia for the outer apparatus.

When a tone adjusting switch 34 and enhancement adjusting switch 35 provided on the front panel of the video processor 4 are respectively operated, said tone adjusting circuit 32 and enhancement adjusting circuit 33 will be able to respectively adjust the tone and enhanced amount through a corrected value setting circuit 56.

For example, the corrected value setting circuit 56 has a switching switch 54 connected with a tone setting terminal 32a of the tone adjusting circuit 32, plural resistances r1 connected in parallel through one contact a of this switching switch 54, analogue switches s1, . . . , a resistance rn and an analogue switch sn. When the tone adjusting switch 34 provided on the front panel is operated to be ON/OFF, the analogue switches s1, . . . , sn will be able to be switched ON/OFF.

Therefore, the voltage of the tone setting terminal 32a is set in response to the value of the resistances rj (j=1, . . . , n) and the tone by the tone adjusting circuit 32 is determined by this voltage.

Also, the contact b of the switching switch 54 is earthed through a trimer resistance rt.

The corrected value setting circuit 56 has a switching switch 55 connected with the enhancement setting terminal 33a of the enhancement adjusting circuit 33 and plural resistances R1, analogue switches S1, . . . , resistances Rm and analogue switches Sm connected in parallel through one contact a of this switching switch 55.

The analogue switches S1, . . . , Sm can be switched ON/OFF by the ON/OFF operation of the enhancement adjusting switch 35 provided on the front panel.

Therefore, the voltage of the enhancement setting terminal 33a is set in response to the value of the resistances Rk (k=1, . . . , m) switched ON by the operation of the enhancement adjusting switch 35 and the enhanced amount by the enhancement adjusting circuit 33 is determined by this voltage.

The contact b of the switching switch 55 is earthed through the trimer resistance Rt.

The two switching switches 54 and 55 are formed of analogue switches. As shown in FIG. 5, the controlling terminal is usually impressed with "H". In this state, the contact a will be switched ON together. When the forcibly set switch 28 is operated to be ON, the controlling terminal will be set in "H", the contacts a of the switching switches 54 and 55 will be switched to be ON and the switching circuit 25 will be switched at the contact A to be ON through the Or circuit 29.

According to this embodiment, when the forcibly set switch 28 is operated to be ON, the switching switches 54 and 55 will be switched respectively at the contacts b to be ON and the tone and enhanced amount in the state set in advance by the trimer resistances rt and Rt will be able to be set.

Therefore, in this embodiment, the same as in the first embodiment, in case any abnormality occurs in the outer peripheral apparatus during the endoscopic examination, the same as in the first embodiment, by the operation of the forcibly set switch 28, the contact B will be switched to the contact A to be ON, the switching signal will be impressed on the switching switches 54 and 55 and the tone value and enhancement will be able to be respectively reset at any values determined by the trimer resistances rt and Rt in advance.

When the corrected value setting circuit 56 is set in advance to be in a picture quality set state (or reference set state) of any tone and enhancement amount by the adjusting switches 34 and 35, irrespective of the tone value and enhancement value before the operation of the forcibly set switch 28, said corrected value setting circuit 56 will be able to be forcibly set to be in a picture quality set state of a tone and enhancement amount of any value (or reference set state).

By the above described operation, in case the same abnormal state as in the first embodiment occurs, the output to the color monitor 5 will be able to be returned not only to the endoscope picture image but also to a picture of any value of respective corrected values (a value or reference state set by the doctors as seen to be natural) so as to be able to operate to suppress the generation of a misdiagnosis (because some doctor makes a diagnosis by colors).

By the way, in case the forcibly set switch 28 is switched OFF and the contact A is set ON by the selecting switch 27, the switching switches 54 and 55 will be ON at the contacts a and, in this state, the tone and enhancement amount set by the adjusting switches 34 and 35 will be in the picture quality set state.

In case the initially set reference set state is returned by the operation of this forcibly set switch 28, the set value (operation value) of the tone adjusting switch 34 and enhancement adjusting switch 35 as manual picture image setting operating means will be reset to be returned to 0 and, by operating the switches from this state, the tone and enhancement adjusted amount in the reference set state may be variably set.

Further, in this embodiment, in case the color is corrected in response to the clinical phase during the examination and then the ordinary value (reference set state) is wanted to be returned, in case plural doctors use this apparatus 1 in common and the present picture quality set state is not known because it is set by another doctor, the reference picture quality set state will be able to be returned by operating the forcibly set switch 28.

When the adjusting switches 34 and 35 are formed to have such data holding means as a latch, the data of the adjusting switches 34 and 35 will be able to be reset as data set in a reference picture quality set state and a desirable tone and enhancement amount will be able to be set from this reference picture quality set state.

By the way, a picture quality set resetting switch returning the state of a picture quality setting means forcibly to the initially set state may be provided separately from said resetting switch so that, in case plural doctors use this video processor 4 in common and the present picture quality set state is not known because it is set by another doctor, the reference picture quality set state may be returned by operating this picture quality set resetting switch.

Further, in case there is a function of controlling the picture quality change from the filing apparatus (for example, the formation in FIG. 7), as the filing apparatus 6 as an outer peripheral apparatus is not abnormal, by the operation of the picture quality set resetting switch, the control from the filing apparatus 6 may be once reset, the control of the picture quality change from the filing apparatus may be dissolved and, as required, the picture quality may be adjusted from the filing apparatus side. The others can be realized by the same formation as in the case that the forcibly set switch 28 is operated.

In this case, the operation of returning the the picture quality to the reference initially set state is made by the picture quality set resetting switch.

Therefore, instead of the picture quality resetting switch, for example, an initially set resetting switch or reference state setting switch may be provided to set the picture quality in the reference state and to set the electric connecting state with the outer peripheral apparatus in a reference electric connecting state (for example, in a state that the picture quality can be controlled from the outer peripheral apparatus but such control is not made).

The same effect as in case said picture quality set resetting switch is provided will be obtained.

Figure 7:
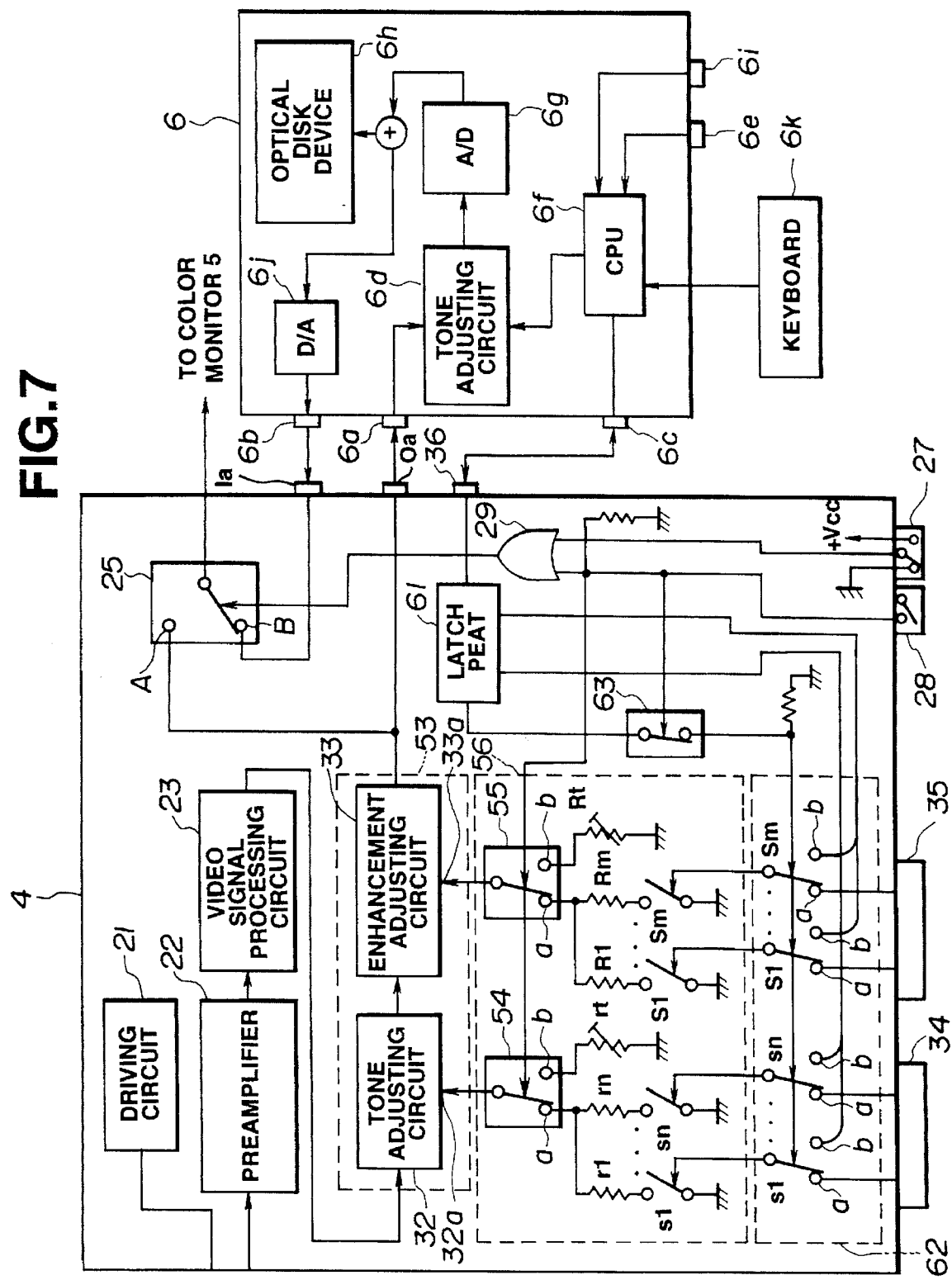
FIG. 7 is a block diagram showing the formation of a video processor in the fifth embodiment of the present invention.

FIG. 7 shows the formation of the video processor 4 of the fifth embodiment of the present invention. In this embodiment, the video processor 4 has a communication terminal 36 for the outer apparatus so that, when it is connected with a communication terminal 6c of the filing apparatus 6, for example, for a video signal to be put into the filing apparatus 6 from the filing apparatus 6 side, the tone adjusting circuit 32 and enhancement adjusting circuit 33 may be adjusted respectively through the tone adjusting terminal and enhancement amount adjusting terminal.

The video signal of the tone and enhancement amount set from the filing apparatus 6 side through the communication terminal 6c is recorded in the optical disk device 6h within the filing apparatus 6 and is put out of the outputting end 6b, is output to the color monitor 5 through the contact B of the switching circuit 25 and the endoscope picture image corresponding to this video signal is displayed.

Also, in this embodiment, by the operation of the forcibly set switch 28, the same as in the first embodiment, the contact A is switched to be ON from the contact B and the resetting signal by the forcibly set switch 28 is impressed respectively at the resetting set terminals of the tone adjusting circuit 32 and enhancement adjusting circuit 33 so that the tone adjusting circuit 32 and enhancement adjusting circuit 33 may be reset respectively in the reference set state.

That is to say, in this embodiment, the tone adjusting circuit 32 and enhancement adjusting circuit 33 provided within the video processor 4 can variably set the tone and enhancement amount of the video signal put out of the video processor 4 by the tone adjusting switch 34 and enhancement adjusting switch 35 provided on the front panel and "H" switching data are latched in the latching part 61 within the video processor 4 through the communication terminals 6c and 36 from the CPU 6f side within the filing apparatus 6 so that the respective contacts b of the respective analogue switches s1, . . . , sn and analogue switches S1, . . . , Sm of the switching switch 62 may be switched to be ON. Also, following the switching data, the CPU 6f latches in the latching part 61 the data determining the ON/OFF of the analogue switches S1, . . . , sn and analogue switches S1, . . . , Sm of the corrected value setting circuit 56 so that the tone and enhancement amount of the tone adjusting circuit 32 and enhancement adjusting circuit 33 may be remote-set.

An analogue switch 63 is provided between the outputting end of the latching part 61 and the switching controlling end of the switching switch 62. This analogue switch 63 is set to be "L" by a pull-down resistance at the controlling end so as to be ON usually.

In case the filing apparatus 6 becomes abnormal, the forcibly setting switch 28 will be switched ON so that, the same as in the case of FIG. 6, the switching switches 54 and 55 may be switched to be ON, the switching switch 25 will be switched so that the contact A may be ON and further, in this embodiment, the analogue switch 63 will be OFF with the control end set at "H" so that the contacts a of all the analogue switches s1, . . . , sn and analogue switches S1, . . . , Sm may be ON.

According to this embodiment, the tone adjusting circuit 32 and enhancement adjusting circuit 33 of the video processor 4 can be controlled also from the filing apparatus 6 side as an outer apparatus of the video processor 4.

Even if the filing apparatus becomes abnormal, when the forcibly set switch 28 is operated, the control from the filing apparatus 6 will be dissolved and, the same as in the case of FIG. 5, the set tone and enhancement amount will be able to be set by the trimer resistances rt and Rt.

Therefore, when the trimer resistances rt and Rt are operated to be set in advance at the time of the delivery from the factory, when the forcibly set switch 28 is operated, irrespective of the set state of the tone and enhancement amount before the operation of the forcibly set switch 28, the picture quality set state of the reference tone and enhancement amount determined by the trimer resistances rt and Rt will be able to be forcibly set.

Further, the same switching from the processed picture image by said filing apparatus 6 can be applied also to such outer video apparatus (or outer video devices) handling other video signals and having a picture image input and output switching function as, for example, a VTR, still video filing apparatus and photomagnetic disk.

In this case, not only said respective adjustments and switchings can be made by the video processor 4 but also, in the formation having a communicating function in the outer peripheral apparatus, the picture quality adjustment and the like can be controlled from the outer peripheral apparatus (or outer peripheral device).

Therefore, when said forcibly set switch 28 is pushed, not only the switching (resetting) to said endoscope picture image but also the picture quality adjustment set value will be able to be reset in the initial state (reference set state).

That is to say, in the fifth embodiment, the filing apparatus 6 has been explained as an outer peripheral apparatus to be connected to the video processor 4. However, even in case such other outer peripheral apparatus as a VTR, still video filing apparatus and photomagnetic disk are simultaneously connected, by substantially the same operation of the forcibly set switch 28, the color monitor 5 may be switched so as to be able to output the video signal by the video processor 4.

In this case, for example, the switching circuit 25 in FIG. 2 is of a formation having many contacts as shown in FIG. 3 so that a plurality of outer peripheral apparatus may be connected. Even in such case, by the operation of the forcibly set switch 28, the contact A will be switched ON so that the video signal through the signal processing system of the video processor 4 may be output to the color monitor 5 (by this resetting operation, the function of setting the picture quality from the outer peripheral apparatus side by the signal connected with the communication terminal 36 will be relieved or released).

Figure 8:
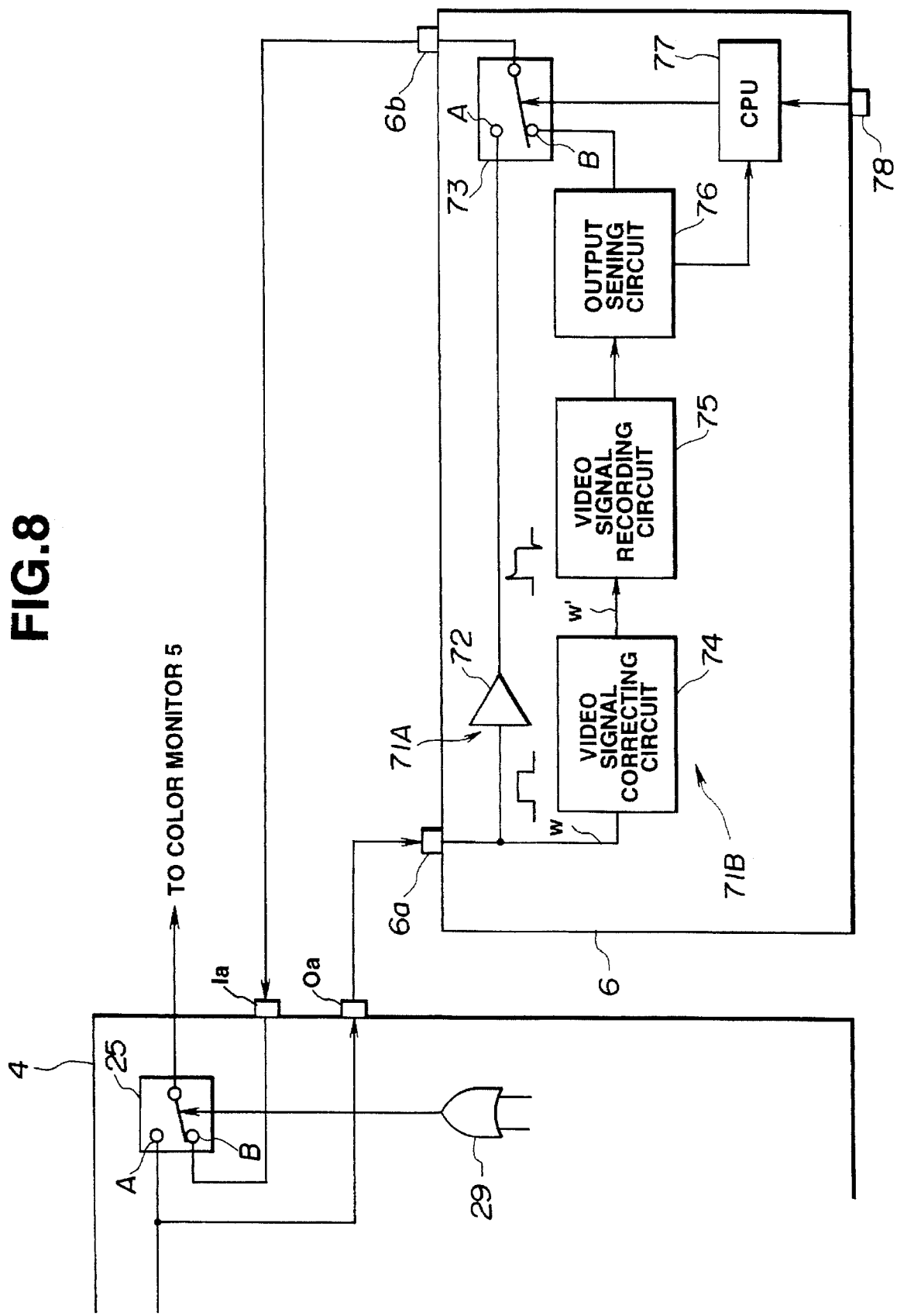
FIG. 8 is a block diagram showing the formation of a filing apparatus in the sixth embodiment of the present invention.

FIG. 8 shows the formation near the connecting part of the switching circuit 25 and filing apparatus 6 in the sixth embodiment of the present invention.

In this embodiment, the signals put into the filing apparatus 6 are divided into the two systems of the processing circuits 71A and 71B. The first processing circuit 71A is of a formation wherein the input signal is put out of the switching circuit 73 through the current amplifying buffer 72.

The other second processing circuit 71B is of a formation wherein the input signal is output through a video signal correcting circuit 74 wherein the input signal is corrected (for example, enhanced to be of a waveform w' different from a waveform w) so as to be recorded, a video signal recording circuit 75 wherein the video of the video signal passed through this video signal correcting circuit 74 is recorded, an output sensing circuit 76 wherein the state of the signal put out of this processing circuit 71B is sensed by sensing the state of the video signal used for this recording and the above mentioned switching circuit 73. In the output sensing circuit 76, whether the video signal put into it is abnormal or not is sensed and, in case it is sensed to be abnormal, the CPU 77 will output an abnormality sensed signal. When the abnormality is sensed, the CPU 77 will switch the contact B to the contact A to be ON.

Either of the contacts A and B can be selected to be ON through the CPU 77 by the operation of a selecting switch 78 provided in the filing apparatus 6.

The basic operation of the filing apparatus 6 is the same as in the fourth or fifth embodiment. In the filing apparatus 6 in this embodiment, the following operations are made in addition to this basic operation. When the second processing circuit 71B is selected, if the video signal of this system becomes abnormal, the output sensing circuit 76 will sense the abnormality and will inform the CPU 77 of the abnormality. Then, the CPU 77 will output a switching signal to the switching circuit 73 and the contact B will be switched to the contact A to be ON.

The system on the buffer 72 side is a system to electrically output through, therefore does not depend on the abnormality of the second processing circuit 71B and outputs the same video signal as the input video signal. When the the filing apparatus 6 is switched from the second processing circuit 71B to the course of the first processing circuit 71A, the video signal will be able to be displayed in the color monitor without being interrupted.

According to this embodiment, even if the signal processing system within the filing apparatus 6 becomes abnormal during the endoscopic examination, the endoscope picture image will be able to be displayed without being interrupted. Also, in case the CPU 77 runs abruptly and does not function normally, when the forcibly set switch not illustrated is operated, the same as in the other embodiments, the video signal on the video processor 4 side will be output in the color monitor 5 and the endoscope picture image will be able to be displayed.

This embodiment has been explained on the filing apparatus 6 as an outer apparatus and can be applied to such other recording apparatus as a VTR connected to the video processor 4.

Figure 9:
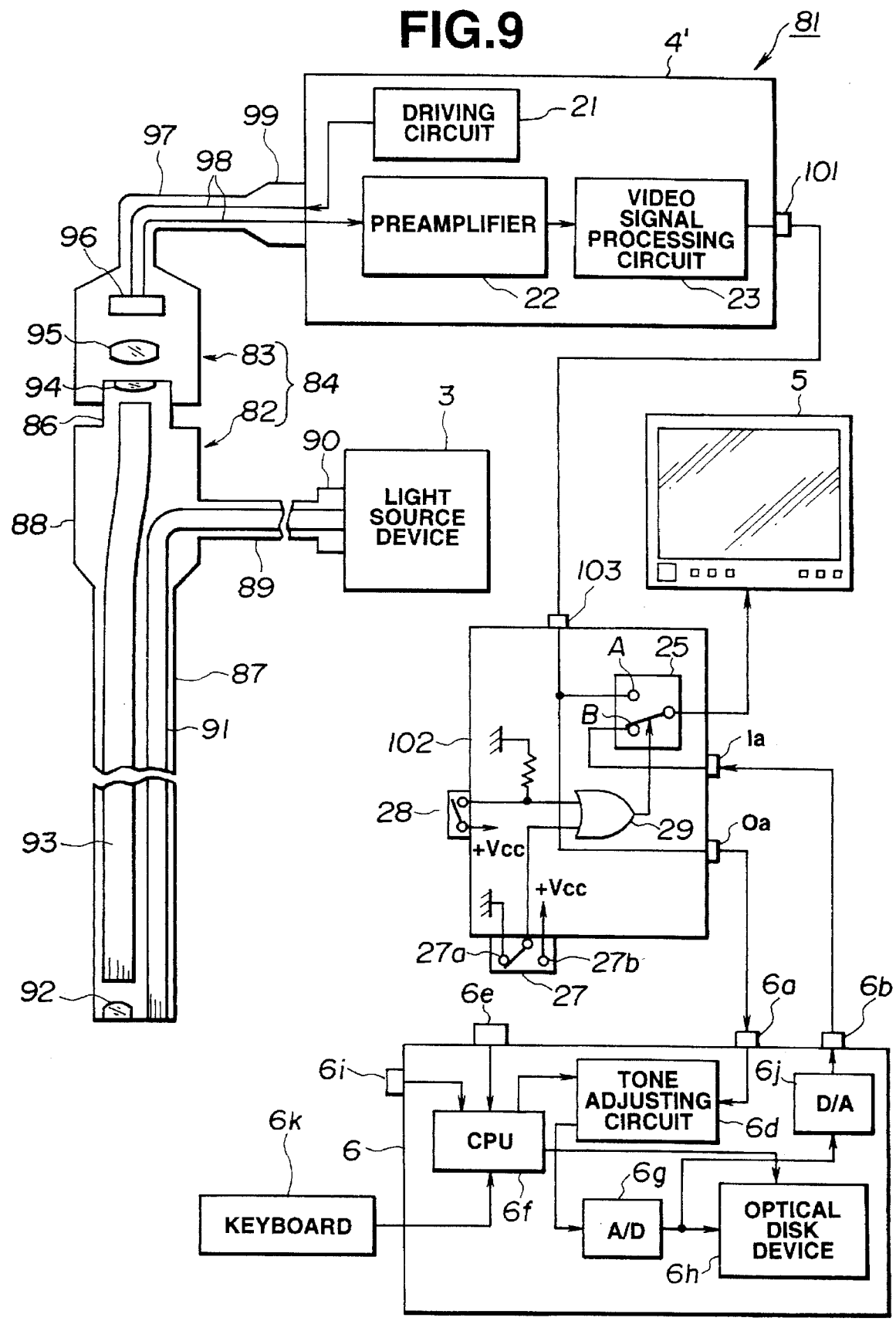
FIG. 9 is a block diagram showing the formation of an endoscope system in the seventh embodiment of the present invention.

FIG. 9 shows an endoscope system 81 of the seventh embodiment of the present invention. In this embodiment, a TV camera fitted scope 84 comprising an optical endoscope 82 and a TV camera 83 fitted to this optical endoscope 82 is used instead of the electronic endoscope 2 in FIG. 1A.

The optical endoscope 81 has an elongate insertable section 87, an operating section 88 formed at the rear end of this insertable section 87, an eyepiece section 86 formed at the rear end of this operating section and a light guide cable 89 extended out of the operating section 88 and a connector 90 at the distal end of this light guide cable 89 can be removably connected to a light source device 3. By this connection, the illumination light from the light source device 3 is fed to the distal end of the light guide 91 within the connector 90, is transmitted by this light guide 91 and is projected forward out of an illuminating window at the distal end of the insertable section 87.

Such object to be photographed as an affected part illuminated by the forward projected illuminating light forms an image in the image forming position by an objective lens 92 fitted to an observing window at the distal end. The distal end surface of the image guide 93 is arranged in this image forming position and an image is formed on this distal end surface. This image is transmitted by the image guide 93 to the rear end surface of the image guide 93, that is, the end surface on the eyepiece section 86 side.

An eyepiece lens 94 is arranged in the eyepiece section 86 as opposed to this rear end surface of the image guide 93 and the image can be observed as magnified. In case the TV camera 83 is fitted to this eyepiece section 86, the image transmitted by the image guide 93 will be formed on a CCD 96 by an image forming lens 95 arranged as opposed to the eyepiece lens 94.

This CCD 96 is connected with cables 98 within a camera cable 97. When a connector 99 at the distal end of the camera cable 97 is connected to a video processor 4', the signal will be processed and will be put out of a video outputting end 101. In this embodiment, the video processor 4' is formed of a driving circuit 21, preamplifier 22 and video processing circuit 23 in a video processor 4 in FIG. 1A and the video inputting end 103 of an adapter 102 is connected to the video outputting end 101.

This adapter 102 is of a formation having a switching circuit 25, Or circuit 29, forcibly set switch 28 and selecting switch 27 in the video processor 4 in FIG. 1A. That is to say, the video processor 4 in FIG. 1A is divided into the body side including a video signal processing circuit 23 and an adapter 102 connected to this body and provided with a switching circuit 25 and a switch system switching it.

The same as in FIG. 1A, this adapter 102 is connected with the color monitor 5 and filing apparatus 6. The other formations are the same as in FIG. 1A.

This system 81 is of the same formation as of the first embodiment except that the TV camera fitted scope 84 is used instead of the electronic endoscope 2 in FIG. 1A and a switching means and its operating means are provided outside the video processor 4.

According to this embodiment, even in the case of an existing video processor having no switching means of the adapter 102, when the adapter 102 is connected, the same operation and effect as in the first embodiment will be obtained.

That is to say, in the above described respective embodiments, the switching circuit 25 forming the switching means is provided within the video processor 4, whereas, in this embodiment, the switching circuit 25 is provided within the adapter 102 outside the video processor 4' and the forcibly set switch 28 connected with this switching circuit 25 and switching the contact A to be ON is provided.

By the way, in FIG. 9, the switching circuit 25 is shown in the case of two contacts A and B but can be applied also the same to the case of having many contacts as in FIG. 3.

By the way, in FIG. 9, the adapter 102 is provided outside the video processor 4' and between it and an outer peripheral apparatus but may be provided within the outer peripheral apparatus. In case the outer peripheral apparatus are plural, when the adapter 102 is provided as in FIG. 9, there will be a merit higher than in the case of providing the adapter 109 in each outer peripheral apparatus that one adapter will do.

Also, the forcibly set switch 28 may be formed of a foot switch.

By the way, in the case, for example, of the fifth embodiment in FIG. 7, the picture quality setting signal will be impressed on the tone adjusting circuit 32 or the like through the communication terminal 36 from the filing apparatus 6 side as an outer peripheral apparatus, therefore, a monitoring means may be provided to monitor whether the range of the signal determining these picture qualities exists within the allowable range or not so that, in case it deviates from the allowable range, the contact A of the switching circuit 25 will be automatically switched to be ON.

In such case, instead of automatically switching, such purport that the picture quality setting has deviated from the allowable range and, therefore, in order to set the picture quality in the range from which it dose not deviate, the forcibly set switch 28 should be operated to reset the picture quality as required from the reference state may be displayed on a comment displaying frame.

Also, different embodiments may be formed by partly combining the above described embodiments and belong to the present invention.

What is claimed is:

1. An endoscope system comprising:

an endoscope comprising an elongate insertable section, an illuminating light projecting means projecting an illuminating light out of the distal end of said insertable section, an objective optical system formed at the distal end of said insertable section to observe an object illuminated by said illuminating light and an imaging means photoelectrically converting an image based on said objective optical system;

a signal processing means processing signals for said imaging means and producing a first video signal;

an outer peripheral means provided outside said signal processing means and processing/controlling a second video signal electrically different from said first video signal;

a selecting means selecting either of said first video signal and said second video signal;

a displaying means displaying either of said first and second video signals selected by said selecting means; and a regulating means regulating the selection of said selecting means to forcibly output said first video signal to said displaying means.

2. An endoscope system according to claim 1 wherein said endoscope is an electronic scope wherein a solid state imaging device provided with a photoelectrically converting function is arranged in the focal plane of said objective optical system.

3. An endoscope system according to claim 1 wherein said endoscope is a TV camera fitted scope having an optical endoscope having an image transmitting means transmitting an optical image by said objective optical system built-in and a TV camera connected to said optical endoscope and having a solid state imaging device provided with a function of photoelectrically converting the optical image transmitted by said image transmitting means built-in.

4. An endoscope system according to claim 1 wherein said switching means can be switched by a manual operation.

5. An endoscope system according to claim 1 wherein said outer peripheral means has a second signal processing means producing said second video signal different in the waveform for said first video signal put out of said signal processing means.

6. An endoscope system according to claim 1 wherein said switching means is provided outside said signal processing means.

7. An endoscope system according to claim 1 wherein said outer peripheral means has a plurality of outer peripheral apparatus, said selecting means can select any one of said plurality of outer peripheral apparatus and said regulating means forcibly outputs said first video signal to said displaying means irrespective of the selection by said selecting means.

8. An endoscope system according to claim 1 wherein a detecting means detecting the abnormality of said second video signal is provided and said switching means is automatically switched by the output signal of said detecting means.

9. An endoscope system according to claim 8 wherein said detecting means detects the abnormality of the synchronous signal of said second video signal.

10. An endoscope system according to claim 9 wherein said detecting means detects the abnormality of the period of said synchronous signal.

11. An endoscope system according to claim 9 wherein said detecting means detects the abnormality of the signal level of said synchronous signal.

12. An endoscope system according to claim 1 wherein said signal processing means has a video correcting means converting at least one of the tone and outline stressed amount of said first video signal to any value.

13. An endoscope system according to claim 12 wherein said any value by said video correcting means can be controlled by said outer peripheral means.

14. An endoscope system according to claim 12 wherein said outer peripheral means is provided within said signal processing means, controls the video correcting means converting said first video signal to an electrically different video signal and produces said second video signal.

15. An endoscope system according to claim 12 wherein said outer peripheral means is connected with said video correcting means through a communicating means, controls said video correcting means through said communicating means and produces said second video signal.

16. An endoscope system according to claim 12 wherein said switching means converts said any value set by said video correcting means as operatively connected with said switching to a predetermined value set in advance.

17. An endoscope system according to claim 16 wherein, in case said switching by said switching means is dissolved, said predetermined value set by said video correcting means will be any value as before said switching.

18. An endoscope system according to claim 16 wherein the predetermined value set in advance by said video switching means can be controlled by the user.

19. An endoscope system according to claim 12 wherein said signal processing means has a setting means setting at least one of the tone and outline stressed amount for said first video signal and a video correcting means converting at least one of the tone and outline stressed amount in response to the set value set by said setting means.

20. An endoscope system according to claim 19 wherein the set value by said setting means can be controlled from said signal processing means side and said outer peripheral means side.

21. An endoscope system according to claim 20 wherein there is a means invalidating the control of said setting means from said outer peripheral means side as operatively connected with said switching by said switching means.

22. An endoscope system comprising:

an endoscope comprising an elongate insertable section, an illuminating light projecting means projecting an illuminating light out of the distal end of said insertable section, an objective optical system formed at the distal end of said insertable section to observe an object illuminated by said illuminating light and an imaging means photoelectrically converting an image based on said objective optical system;

a signal processing means processing a signal for said imaging means and producing a first video signal;

an outer peripheral means provided outside said signal processing means and processing/controlling a second video signal electrically different from said first video signal;

a displaying means displaying said first video signal; and a switching means switching said first video signal to said second video signal to be put out to said displaying means.

23. An endoscope system comprising:

an endoscope comprising an elongate insertable section, an illuminating light projecting means projecting an illuminating light out of the distal end of said insertable section, an objective optical system formed at the distal end of said insertable section to observe an object illuminated by said illuminating light and an imaging means photoelectrically converting an image based on said objective optical system;

a signal processing means processing a signal for said imaging means and producing a first video signal;

an outer peripheral means provided outside said signal processing means and processing/controlling a second video signal electrically different from said first video signal; and a switching means ordinarily displaying the second video signal and as required switching said first video signal to said second video signal to be displayed.

24. An endoscope system comprising:

an endoscope comprising an elongate insertable section, an illuminating light projecting means projecting an illuminating light out of the distal end of said insertable section, an objective optical system formed at the distal end of said insertable section to observe an object illuminated by said illuminating light and an imaging means photoelectrically converting an image based on said objective optical system;

a signal processing means processing a signal for said imaging means and producing a first video signal;

an outer peripheral means provided outside said signal processing means and processing/controlling a second video signal electrically different from said first video signal;

a selecting means selecting either of first video signal and said second video signal; and a regulating means regulating the selection of said selecting means to forcibly output said video signal to the displaying means.

25. An endoscope system according to claim 24 wherein said switching means is provided within said signal processing means.

26. An endoscope system according to claim 24 wherein said switching means is provided outside said signal processing means.

* * * * *